United States Patent [19]

Smith

[11] 3,847,355

[45] Nov. 12, 1974

[54] TORCH APPARATUS

[75] Inventor: John E. Smith, Lake Elmo, Minn.

[73] Assignee: Tescom Corporation, Minneapolis, Minn.

[22] Filed: Dec. 5, 1973

[21] Appl. No.: 421,840

[52] U.S. Cl. ............................................ 239/424.5
[51] Int. Cl. ............................................. B05b 7/06
[58] Field of Search ............. 239/419.3, 422, 424.5

[56] References Cited
UNITED STATES PATENTS

| 1,324,866 | 12/1919 | Wilcox | 239/424.5 |
| 2,483,467 | 10/1949 | Jones | 239/424.5 |
| 3,053,312 | 9/1962 | Villoresi | 239/424.5 |
| 3,558,062 | 1/1971 | See | 239/419.3 |
| 3,583,643 | 6/1971 | Ollivier et al. | 239/424.5 |
| 3,643,871 | 2/1972 | Hamernik et al. | 239/419.3 |

Primary Examiner—Lloyd L. King
Attorney, Agent, or Firm—Dugger, Johnson & Westman

[57] ABSTRACT

Torch apparatus that includes a torch head having a torch bore opening through axially opposite ends of the torch head, a mixer threadedly retained in the torch bore, and a torch tip extending within said bore and removably retained therein by the mixer holding the tip flange against a torch head shoulder. A mixer cutting oxygen passageway at each end respectively opens to a corresponding passageway in the torch head and torch tip while the tip oxygen-fuel gas passageways open to oxygen-fuel gas passageways in the mixer that in turn opens to a preheat oxygen passageway and a fuel gas passageway in the torch head.

12 Claims, 4 Drawing Figures

PATENTED NOV 12 1974　　　　　　　　3,847,355

TORCH APPARATUS

BACKGROUND OF THE INVENTION

Torch apparatus that includes a torch head, a gas mixer and a torch tip mounted by the torch head to abut against the mixer.

In cutting, heating and welding torches, torch tips usually wear faster than the torch head or mixer, and thus it is desirable to be able to replace the torch tip. However, with prior art replaceable torch tips, for example, U.S. Pat. Nos.3,643,871 and 3,575,354, the head nut for securing the tip to the head frequently obstructs the line of vision. Also, as a result of using a head nut for securing the tip to the torchhead, the tip is usually made of a relatively longer length in order to decrease interference with the line of sightthan would be necessary if the head nut could be dispensed with. In order to overcome problems such as the above, as well as others, this invention has been made,

SUMMARY OF THE INVENTION

Torch apparatus that includes a torch head having an axially elongated torch head bore that at each end opens outwardly of the torch head, a gas mixer mounted in the bore to extend outwardly thereof and a torch tip mounted on the torch head and having a sealing surface within said bore to about against a corresponding surface of mixer, the torch tip being removably retained in the bore by the mixer.

One of the objects of this invention is to provide a new and novel mounting of a gas mixer and torch tip in a torch head bore. Another object of this invention is to provide new and novel torch apparatus having a gas mixer and a torch tip extending in abutting relatonship in a torch head bore for removably retaining the torch tip in a seated position extending within the bore. An additional object is to provide a new and novel mounting of a torch tip on a torch head to minimize line of sight interference with the work and permit the usage of a shorter tip.

Figure 1:
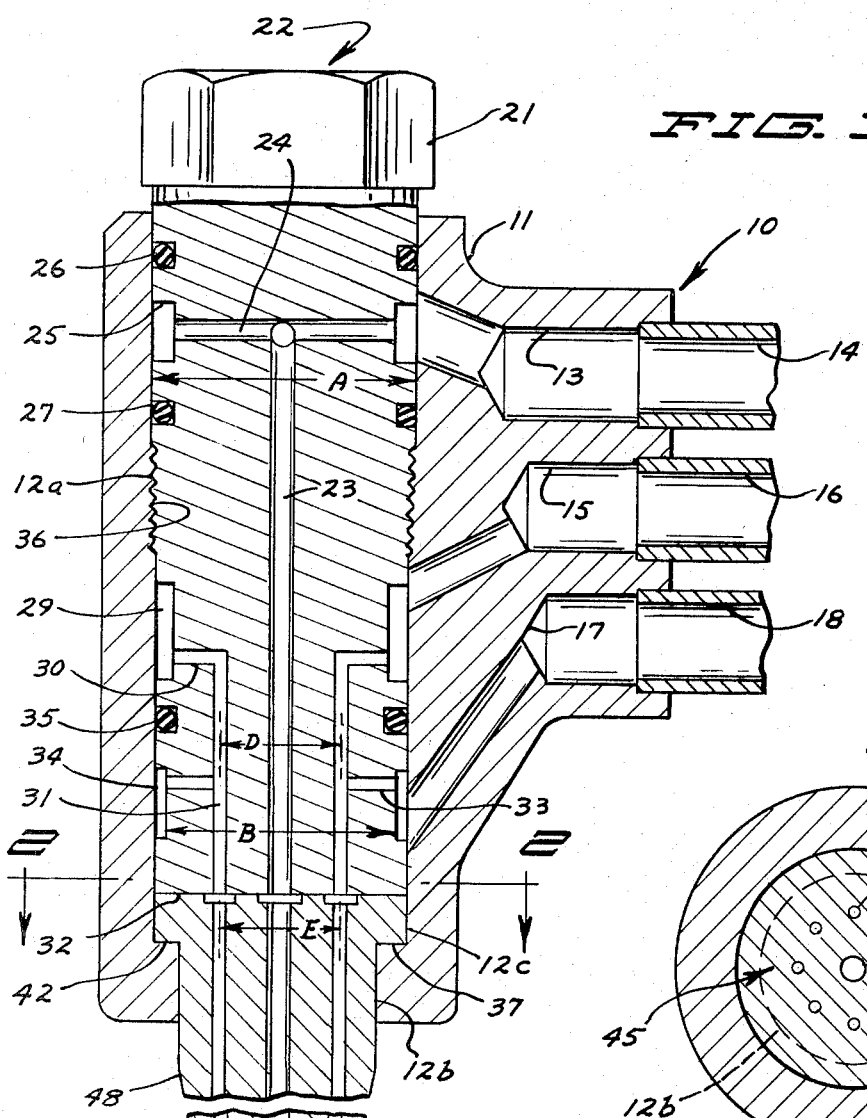
FIG. 1 is an axial cross-sectional view of the torch head, mixer and torch tip of the first embodiment of this invention, said view schematically showing the connection of the sources of cutting oxygen, preheat oxygen and fuel gas to the torch head.
Figure 2:
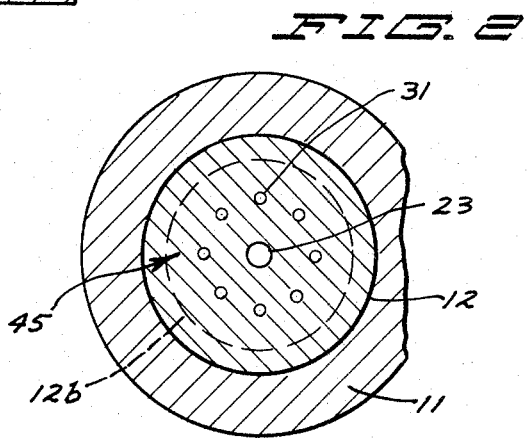
FIG. 2 is a transverse cross-sectional view generally taken along the line and in the direction of the arrows 2—2 of FIG. 1 to further illustrate the construction of the mixer and torch head.
Figure 3:
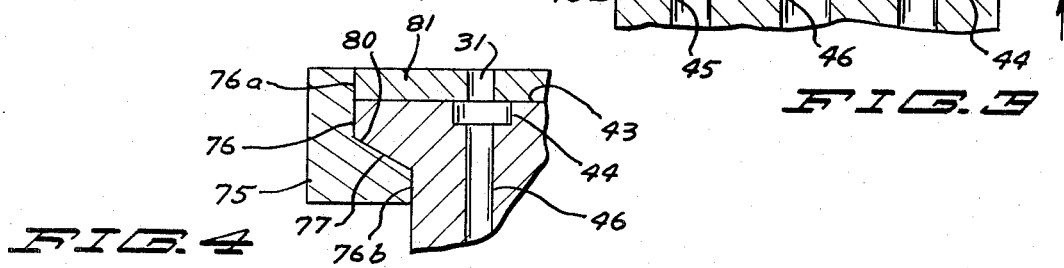
FIG. 3 is a fragmentary cross-sectional view of a portion of the tip of FIG. 1 that is adjacent the mixer.

The torch apparatus of the first embodiment of the invention, generally designated 10, includes a torch head 11 having an axially elongated torch bore 12 opening through opposite end surfaces thereof, a cutting oxygen passageway 13 having a cutting oxygen conduit 14 seated in one end thereof and opening thereto and an opposite end opening through the circumferential wall of bore 12; a preheat oxygen passageway 15 having a preheat oxygen conduit 16 seated in one end thereof and opening thereto and at the other end opening through the circumferential wallof the torch head bore; and fuel gass passageway 17 having one end of the fuel gas conduit 18 seated therein and opening thereto and at the other end opening through the circumferential wall of bore 12 at a substantially greater axial distance from the opening of the cutting oxygen passageway to bore 12 than the preheat oxygen passageway 15.

Mounted in the torch head bore to extend outwardly through one end thereof is a mixer, generally designated 22, that has a head portion 21 axially outwardly of the torch head. The head portion 21 in transverse cross section is desirably of polyagonal shape, for example, hexagonal, to facilitate turning the mixer with the wrench for purposes to be set forth herein after. The mixer has an axially elongated central bore 23 that opens through the inner end surface 32 of the mixer and at the opposite end opens to a plurality of cross bores 24 which in turn open to the annular groove 25 formed in the outer circumferential portion of the mixer. Groove 25 is located in a position to open directly to the cutting oxygen passageway 13 when the mixer is mounted in place in the torch head. Axially on either side of groove 25, the mixer is provided with an annular groove for mounted 0-rings 26 and 27 respectively that form fluid seals with the adjacent circumferential wall portion of the torch head bore 12 with 0-ring 26 being above the opening of the passageway 13 to the bore 12 and 0-ring 27 below the passageway 13.

The mixer is also provided with an annular groove 29 that opens to the one ends of the plurality of cross bores 30 which at their opposite ends open to the one end of the respective axially elongated oxygen-fuel gas bore 31. Each of the bores 31 at their opposite ends open through the generally planar end surface 32 of the mixer. The mixer is also provided with an annular groove 34 that opens to the fuel gas passageway 17, each of the mixer passageways 31 being connected to the groove 34 by a cross bore 33. Axially between grooves 29 and 34, the mixer is provided with an annular groove that mounts an O-ring 35 for forming a fluid seal with the circumferential wall of bore 12.

Axially between annular groove 29 and 0-ring 27, the mixer is provided with external threads 36 that form a threading fit with threads 12a of the wall defining the torch head bore. The threads 12a are located axially between the opening of the passageways 13, 15 to the bore 12.

The lower end portion 12b of bore 12 is of a reduced diameter to form an upwardly facing shoulder 37 at a location axially spaced from the mixer surface 32 and therebelow when the mixer is threaded in the bore.

The torch tip, generally designated 41, is axially elongated and has an enlarged diametric end portion 42. Portion 42 has a generally planar surface 43 to form a sealing fit with surface 32 and an annular surface axially opposite surface 32 to form a sealing fit with shoulder 37. Portion 42 is provided with an annular groove 44 of inside and outside diameters to open to to adjacent ends of the mixer oxygen-fuel gas passageway 31 and a plurality of oxygen-fuel gas passageways 45 that at their one ends open to groove 44 and at their opposite ends to the opposite ends of the torch tip. Further, the torch tip is provided with an axially elongated central cutting oxygen passageway 46 that at one end opens to the mixer bore 23. Further, the top has an intermediate diametric portion 48 that forms a close fit with bore portion 12b.

The relative diameters of the torch head bore 12 and the enlarged diametric portion 42 are such that the torch tip may be inserted through the upper end of the bore 12 and moved downwardly to have the enlarged diametric portion seat against shoulder 37. Further, the outer diameters of the mixer below the threads 36 are such that the portion of the mixer below said threads may be slid through the torch head bore until threads 36 are adjacent threaded portion 12a and thence the mixer threaded to a position holding the tip against shoulder 37 without the portion below threads 36 abutting against threads 12a. Thus, once the tip has been inserted into the torch head bore, the mixer is threaded into the torch head bore to have the surface 32 bear against surface 43 with sufficient pressure to form a fluid seal between said surfaces, and the enlarged diametric portion 42 bear against shoulder 37 with sufficient pressure to form a fluid seal therebetween. The head 21 is provided to facilitate threading the mixer into the bore. At the same time, by unthreading the mixer from the torch head, the torch tip 41 may be easily removed and replaced with another torch tip.

In order to have the desired flash back sensitivity and capacity, the mixer diameter A adjacent the fuel gas cross holes should be of about 0.600 to 0.620 inch and preferrably 0.608 to 0.615 inch, while the diameter B of the gas distribution chambers is in the range of about 0.550 to 0.600 inch. The preferred range of diameters for each of the cross bores 30, 33 is about 0.022 to 0.031 inch. As to each of the oxygen fuel gas passageways 31 the diameter should be about 0.030 to 0.060 inch and preferrably 0.042 to 0.052 inch. The centers of passageways 31 are located on the whole circle of a diameter D ranging from about 0.300 to 0.400 inch. The number of passageways 31 can range from five to nine and can be used with tips having four to eight passageways 45 for acetylene and Mapp Gas and multiple slots (not shown) for L. P. gases. Thr circle diameter E of the centers of tip passageways 45 range from about 0.300 to 0.460 inch.

The axial length G of the groove 44 can range from 0.010 to 0.100 inch, depending on the size of the tip. Further the range of outside diameters R of the flange portion of the tip is about 0.620 to 0.690 inch; the outside diameter S of the groove 44 is about 0.450 to 0.550 inch; the inside diameter T of the groove 44 is about 0.240 to 0.280 inch; and the diameter W of bore portion 46a is about 0.100 inch.

Figure 4:
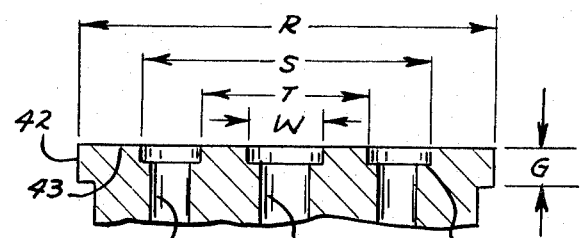
FIG. 4 is a fragmentary axial cross-sectional view of the second embodiment of the torch head, mixer and torch tip of this invention.

Referring to FIG. 4, the second embodiment of the invention is of the same construction as the first embodiment except for the differences referred to hereinafter. The second embodiment includes a torch head 75 having a torch head bore 76 that between the main bore portion 76a and the reduced diameter bore portion 76b has a frusto conical bore portion providing a frusto conical shoulder 77 that is tapered at a substantial angle. The enlarged diametric flange of the torch tip has a frustoconical surface 80 axially opposite surface 43 that is of an opposite taper from that of the surface of the shoulder to form a sealing fit with shoulder 77 and is releasably retained there against by mixer 81.

Instead of having a circular cylindrical torch head bore 12, the torch head may be provided with bore portions tapered downwardly and inwardly for receiving the mixer that forms a metal to metal seal at the locations of the O-rings 26, 27, 35 and the mixer instead of having O-ring grooves and O-rings would have tapered portions to form fluid seals with the radially adjacent bore portions.

I claim:

1. Torch head apparatus comprising a torch head having an axially elongated torch head bore that at each end opens outwardly of the torch head, said torch head bore having a first bore portion opening outwardly of the torch head at one end and a reduced diameter bore opening at one end to the first bore portion to define a shoulder facing toward the first bore portion one end and opening at the other end outwardly of the torch head, an axially elongated torch tip having an enlarged diametric portion seatable against said shoulder and a tip portion extending through said reduced diameter bore portion and outwardly from the torch head, and a mixer removably mountable in the first bore portion, said mixer and torch tip having abuttable end surfaces, said mixer and torch head having cooperating means for retaining the mixer in abutting relationship with the torch tip to hold the torch tip against said shoulder, said mixer having a cutting oxygen passageway opening through said mixer surface and a plurality of preheat oxygen-fuel gas passageways opening through said mixer surface radially outwardly of the opening of the mixer cutting oxygen passageway through said mixer surface, said torch head having passageways for conducting cutting oxygen, and preheat oxygen and fuel gas to the respective mixer passageway, and said tip having a cutting oxygen bore opening through said tip surface to the mixer cutting oxygen passageway and oxygen-fuel gas passageways opening to the mixer oxygen-fuel gas passageways.

2. The apparatus of claim 1 further characterized in that said mixer has a terminal head portion extending outwardly of the torch head axially remote from said mixer surface.

3. The apparatus of claim 1 further characterized in that said cooperating means comprises a threaded head portion defining a part of the head bore and a mixer portion having threads to form a threading fit with the torch head threaded portion.

4. The apparatus of claim 3 further characterized in that the torch head passageways open to the torch head bore in axial spaced relationship to one another and that the torch head threaded portion extends axially intermediate an adjacent pair of the openings of the torch head passageways to the torch head bore.

5. The apparatus of claim 3 further characterized in that said enlarged diameter portion has said tip end surface, an annular groove opening through said tip end surface to the mixer preheat oxygen fuel gas passageways for placing said mixer preheat oxygen-fuel gas passageways in fluid communication with the tip preheat oxygen-fuel gas passageways and an annular surface seatable against the torch head shoulder in fluid sealing relationship relative thereto.

6. The apparatus to claim 3 further characterized in that said enlarged diametric portion has a frusto conical surface axial opposite said tip end surface and that said shoulder is frusto conical and of a taper opposite the taper of the enlarged diametric portion frusto conical surface.

7. The apparatus of claim 3 further characterized in that said enlarged diametric portion has a planar annular surface axially opposite the tip end surface.

8. Torch head apparatus comprising a torch head having an axially elongated torch head bore that at each end opens outwardly of the torch head, said torch head bore having a first bore portion opening outwardly of the torch head at one end and a reduced diameter bore opening at one end to the first bore portion to define a shoulder facing toward the first bore portion one end and opening at the other end outwardly of the torch head, said first bore portion having internal threads, an axially elongated torch tip having an enlarged diametric portion seatable against said shoulder and a tip portion extending through said reduced diameter bore portion and outwardly from the torch head, and a mixer extendable within said first bore portion and abuttable against the tip for retaining the tip enlarged diametric portion against the shoulder, said mixer having an external threads that form a threading fit with the first bore portion threads, said torch head having fluid passageways opening to the first bore portion, said tip having elongated fluid passageways extending axially therethrough, and said mixer having fluid passageways for conducting fluid from the torch head passageways to the tip passageways when the mixer is threaded in the first bore portion to hold the tip against said shoulder.

9. The apparatus of claim 8 further characterized in that said enlarged diametric portion has a substantially planar end surface axially opposite said shoulder that has the tip passageways opening therethrough, and that the mixer has an end surface abuttable against the enlarged diametric portion end surface in fluid sealing relationship therewith with the mixer passageways opening to the tip passageways.

10. The apparatus of claim 9 further characterized in that the mixer is of an axial length to extend outwardly of the torch head bore when the mixer holds the torch tip against said shoulder.

11. The apparatus of claim 10 further characterized in that the tip passageways comprise an annualr groove opening through the enlarged diametric portion end surface and a plurality of angularly spaced fluid passages opening to the annular groove, and that the enlarged diametric portion has a frusto conical surface axially opposite the enlarged diametric portion end surface that is tapered radially outwardly in a direction axially toward the enlarged diametric portion end surface.

12. The apparatus of claim 11 further characterized in that said shoulder is of a frusto conical shape that is of a taper opposite that of the tip frusto conical surface.

* * * * *